| United States Patent [19] | [11] | 4,076,915 |
|---|---|---|
| Trepka | [45] | Feb. 28, 1978 |

[54] TREATMENT OF COUPLED POLYMERS PRIOR TO HYDROGENATION

[75] Inventor: William J. Trepka, Bartlesville, Okla.

[73] Assignee: Phillips Petroleum Company, Bartlesville, Okla.

[21] Appl. No.: 694,123

[22] Filed: Jun. 8, 1976

[51] Int. Cl.$^2$ .............................................. C08F 8/04
[52] U.S. Cl. .............................. 526/25; 260/880 R; 260/880 B; 526/26; 526/29; 526/47; 526/47.3
[58] Field of Search ....................... 526/25, 26, 29, 48, 526/47; 260/880 B, 880 R

[56] References Cited

U.S. PATENT DOCUMENTS

| 2,833,749 | 5/1958 | Jones et al. ........................... 526/29 |
| 2,864,809 | 12/1958 | Jones et al. ......................... 260/85.1 |
| 2,975,160 | 3/1961 | Zelinski ............................... 260/83.7 |
| 2,997,453 | 8/1961 | Short et al. .......................... 260/45.5 |
| 3,113,986 | 12/1963 | Breslow ............................... 260/683.9 |
| 3,317,503 | 5/1967 | Naylor ................................. 260/94.3 |
| 3,350,380 | 12/1967 | Strobel ................................. 260/94.7 |
| 3,468,972 | 9/1969 | Hsieh .................................. 526/29 |
| 3,492,369 | 1/1970 | Naylor ................................. 260/879 |
| 3,692,874 | 9/1972 | Farrar et al. ......................... 260/880 B |
| 3,852,252 | 12/1974 | DeVault et al. ..................... 260/85.1 |

FOREIGN PATENT DOCUMENTS

| 21,224 | 4/1972 | Australia ................................. 526/25 |
| 1,245,797 | 9/1971 | United Kingdom ................... 526/25 |

Primary Examiner—William F. Hamrock

[57] ABSTRACT

Treating a silicon-coupled or germanium-coupled conjugated diene polymer with a hydrocarbonlithium, -sodium, -potassium, -calcium, -magnesium, -zinc or -aluminum compound after the coupling step and prior to hydrogenation.

26 Claims, No Drawings

TREATMENT OF COUPLED POLYMERS PRIOR TO HYDROGENATION

FIELD OF THE INVENTION

The invention pertains to methods of treatment of polymers to reduce the olefinic unsaturation thereof. In a further aspect, the invention pertains to processes for the hydrogenation of polymers.

BACKGROUND OF THE INVENTION

In the formation of coupled polymers, an alkali metal or alkaline earth metal terminated polymer is treated with a polyfunctional compound containing two or more reactive sites capable of reacting with the carbon-metal bonds of the alkaline earth or alkali metal terminated polymer. Polymers derived from difunctional coupling agents are linear, while coupled polymers derived from coupling agents possessing three or more reactive sites are termed "radial polymers". Coupled polymers, particularly the radial polymers, have been of particular value because of the improvements in Mooney viscosity, processibility, and reduction in cold flow that these polymers exhibit relative to their respective parent uncoupled polymers.

Hydrogenation of polymers to reduce the unsaturation within the polymers improves the polymer resistance to environmental attack, e.g., from oxygen and/or ozone. Effectiveness of hydrogenation, and the value of the resultant hydrogenated polymer, is dependent on the reasonable completeness of the hydrogenation, particularly of the olefinic unsaturation, otherwise significant degrees of remaining olefinic unsaturation provide sites for degradative environmental attack.

Contaminants that impede hydrogenation theoretically can be removed by repeated coagulation, recovery, purification by various means such as molecular sieves, redissolution, and the like, of the polymer. These treatments, however, add expense, and in themselves may introduce contaminants, due to traces of oxygen, moisture and the like, in the solvents used.

At the same time, improvements have been sought with regard to hydrogenation conditions and parameters. For example, minimizing the time of exposure of the polymer to peak hydrogenation temperatures assists in avoiding breakdown of the polymer during hydrogenation, thus maintaining, as far as possible, benefits obtained from the increase in molecular weight, increased Mooney values, obtained through the coupling procedures.

BRIEF SUMMARY OF THE INVENTION

I have discovered an effective method of pretreatment of silicon-coupled or germanium-coupled conjugated diene polymers whereby subsequent hydrogenation can be conducted in shorter times thus reducing exposure of the polymer to peak temperatures, with reduced catalyst consumption, while obtaining very low residual olefinic unsaturation in the polymer.

In accordance with my invention, I treat solutions of silicon-coupled or germanium-coupled conjugated diene polymers with a hydrocarbylmetal treating agent which is a hydrocarbonlithium, -sodium, -potassium, -calcium, -magnesium, -zinc or -aluminum compound prior to contacting with the hydrogenation catalyst.

DETAILED DESCRIPTION OF THE INVENTION

In accordance with my invention, solutions (cements) of silicon-coupled or germanium-coupled conjugated diene polymers are pretreated with a hydrocarbonlithium, -sodium, -potassium, -calcium, -magnesium, -zinc or -aluminum compound prior to the hydrogenation step.

My process is applicable to silicon- and germanium-coupled linear or radial conjugated diene polymers, formed by the reaction of a lithium or other alkali metal or alkaline earth metal terminated polymer with a silicon- or germanium-based coupling agent. The term "conjugated diene polymers" includes conjugated diene homopolymers, conjugated diene copolymers, and copolymers of a conjugated diene with a copolymerizable vinylidine group container comonomer, preferably a monovinyl arene, either rubbery or resinous, though presently preferably rubbery. The copolymers include those exhibiting a block structure including tapered blocks, and random blocks as well as homopolymeric blocks.

TREATING AGENTS

In accordance with my invention, the silicon- or germanium-coupled conjugated diene polymer is treated as a solution with an organometal treating agent which is a hydrocarbon metal compound prior to the hydrogenation step, wherein the metal is selected from the group consisting of lithium, sodium, potassium, calcium, magnesium, zinc and aluminum.

The treating agents can be represented by the formula $R_aH_bM$ wherein M is lithium, sodium, potassium, magnesium, calcium, zinc or aluminum. H is hydrogen. R represents a hydrocarbon radical which can be alkyl (linear or branched), cycloalkyl, aryl, or a combination radical such as alkaryl or aralkyl. In the case of lithium, sodium, or potassium, $a$ is 1 and $b$ is 0. In the case of magnesium, zinc or calcium, $a$ is 2 and $b$ is 0. In the case of aluminum, $a$ is 1, 2, or 3; and $b$ is 0, 1, or 2; such that $a + b = 3$. The R radicals where $a$ is 2 or 3 can be the same or different. The R radicals preferably should not exceed 12 carbon atoms per radical, such that the total number of carbon atoms per molecule does not exceed 20, not a matter particularly of operability, simply as a matter of reasonable convenience and availability. For the same reasons, preferably R should have a value of 1 to 6. Presently preferred are treating agents in which M is lithium because of convenience, availability, and results.

Exemplary compounds include n-butyllithium, sec-butyllithium, tert-butyllithium, n-amylsodium, n-hexylpotassium, di-n-amylmagnesium, dimethyl-magnesium, diethylmagnesium, diisopropylcalcium, di-n-butylmagnesium, di(2- ethylhexyl)magnesium, diethylzinc, phenyllithium, diphenylmagnesium, benzyllithium, p-tolyllithium, di-p-tolylmagnesium, cyclohexyllithium, cyclohexyl-2- ethylpentylmagnesium, bis(3-phenylpropyl)magnesium, trimethylaluminum, triethylaluminum, di-n-butylaluminum hydride, 2-ethylhexylaluminum dihydride, triphenylaluminum, cyclohexylbis(2-ethylpentyl)aluminum, and the like, or admixtures. It will be realized that other corresponding hydrocarbyl metal species and hydrocarbyl metal hydride species are suitable wherein M is as defined above and which correspond to the generic formula.

The amounts of the organometal treating agent, treatment reaction temperatures, reaction times, can vary widely, and should be that minor amount effective, at a reaction temperature effective, and for a time effective, to produce the desired reduction in hydrogenation conditions and/or reduction in residual olefinic unsaturation. Presently recommended is a broad range of organometal treating agent of about 0.1 to 25 gram millimoles per 100 grams of coupled polymer, presently preferred about 1 to 10.

Treating temperatures can vary widely. An exemplary broad temperature range for the treatment of the polymer solution is in the range of about 10° to 110° C, presently preferred about 20° to 90° C because of convenience and good effectiveness. Convenient is a temperature similar to the temperature used in polymerization.

Reaction times can vary widely. Considered exemplary is a time in the range of about 0.1 to 60 minutes or more, presently preferred about 1 to 20 minutes because it is sufficient to be satisfactorily effective and short enough to be reasonably economical.

The treatment of the conjugated diene polymer with the organometal treating agent in accordance with the method and process of my invention is conducted with the polymer in the form of a solution or dispersion of the polymer in a hydrocarbon solvent or diluent. Thus, if the coupled polymer is not already in solution, it should be dissolved in a hydrocarbon solvent. For purposes of this invention, the term "solution" is also intended to encompass dispersions of the polymer in a suitable diluent. The hydrocarbon diluent can be aliphatic, cycloaliphatic, aromatic, or mixture. Exemplary solvents include cyclohexane, hexane, methylcyclohexane, benzene, toluene, isooctane, n-heptane, and the like, and typically employable and convenient is the hydrocarbon diluent in which the polymer such as allylic hydrogen atoms are not recommended because of possible side reaction with the treating agent.

The concentration of the coupled polymer in the hydrocarbon diluent can vary widely. Presently convenient is an exemplary broad range of about 1 to 50 weight percent of coupled polymer relative to total weight of polymer and solvent, presently preferred about 5 to 25, since the viscosity of the solution is low enough to be conveniently handled and stirred for adequate temperature control and mixing during treatment.

The contacting of the polymer with the treating agent preferably should be in the substantial absence of any materials which would react undesirably with the treating agent, such as air, water, acidic components, and the like.

It is convenient and preferred to employ the organometal treating agent as a solution or dispersion in a hydrocarbon diluent, such as hexane, heptane, cyclohexane, benzene, toluene and isooctane. A concentration of the organometal treating agent of such as about 0.1 to 2 molar can be considered exemplary and suitable, though lesser or greater concentrations are operable.

The organometal treating agent can be admixed with the polymer solution in any convenient manner, such as in a closed reactor means under an inert gas blanket, or the like, allowing sufficient reaction temperature and time to provide the desired improvement in hydrogenation.

The organometal-treated coupled polymer solution then can be employed directly in the hydrogenation step. Or, if desired, the treated polymer can be isolated by conventional means, such as coagulation, steam stripping, or the like, prior to hydrogenation. If an isolation step is employed, the polymer, of course, is redissolved in a suitable hydrocarbon solvent prior to hydrogenation. Most convenient, of course, is to polymerize the monomer or monomers in a hydrocarbon diluent, treat the resulting polymer to produce the coupled polymers, then treat the coupled polymer with the organometal treating agent, and finally hydrogenate, all without intervening recovery steps.

Thereafter, the so-treated polymer solution is hydrogenated under conditions effective to substantially reduce olefinic unsaturation, preferably leaving essentially unhydrogenated the aromatic unsaturation present from the monovinyl aromatic hydrocarbon monomer(s), if such were employed.

The hydrogenation step can be conducted employing catalysts comprising the reaction products of (A) aluminum alkyl compounds $R_3$ Al with either (B) nickel or cobalt carboxylates or alkoxides. The hydrogenation step exemplarily employs a catalyst concentration in the range of about 0.1 to 20 gram millimoles of (B) nickel or cobalt compound per one hundred grams polymer, preferably about 1 to 10 gram millimoles. The (A) aluminum alkyl compounds exemplarily are employed with the (B) nickel or cobalt compounds in amounts ranging from about 1:1 to 6:1 mole (A) aluminum alkyl compound per mole (B) nickel or cobalt compound, and preferably from about 2:1 to 4:1. These compounds are conveniently employed by using an (A) aluminum alkyl and a (B) nickel or cobalt carboxylate or alkoxide each at concentrations of about 0.5 to 1.5 molar. Preferably and conveniently the catalyst components are admixed prior to contacting the organometal-treated coupled polymer solution, but can be added separately where desired.

Exemplary aluminum alkyl compounds include triisobutylaluminum, triethylaluminum, triisopropylaluminum, tripropylaluminum, trioctylaluminum, and the like, alone or in admixture. Exemplary nickel or cobalt carboxylates or alkoxides include nickel or cobalt acetate, propionate, benzoate, octanoate, butoxide, isopropoxide, and the like, alone or in admixture.

Exemplary hydrogenation conditions include hydrogenation of the polymer in a hydrocarbon diluent, and conveniently this can be the same as employed for the treatment step described above with the organometal treating agents. Convenient is employment of the same diluent as employed for the polymerization step, thus permitting polymerization, treatment with the organometal compound, and hydrogenation, all to be conducted in the same diluent. Hydrogenation temperatures can range widely, but exemplary are temperatures in the range of about 25° to 175° C, preferably about 25° to 105° C, employing a pressure which is in the range of about 10 to 5000 psig (69 to 34,000 kPa), at times ranging from a few minutes such as about 30 minutes to several hours such as about 4 hours or more.

After hydrogenation, the catalyst components can be converted to water soluble salts and washed from the polymer solution. The hydrogenated polymer can be recovered by means known in the art, such as coagulation with a lower alcohol, such as isopropyl alcohol, and the like. Conveniently and preferably an antioxidant such as 2,6-di-ti-butyl-4-methylphenol or 2,2-methylenebis(4-methyl-6-t-butylphenol) is added at the time of or just prior to coagulation.

EXAMPLES

Examples presented are considered a part of my disclosure, and are intended to assist one skilled in the arts to which the invention appertains toward an understanding of my invention. Particular components used, relationships, amounts of materials, particular conditions, are exemplary, and not intended to be limitative of the reasonable scope of my invention including my overall disclosure including claims.

EXAMPLE I

A 70/30 weight ratio butadiene/styrene radial block rubbery copolymer prepared in cyclohexane solution employing incremental monomer addition with n-butyllithium as initiator, tetrahydrofuran as randomizing agent, and silicon tetrachloride as coupling agent, was employed in the following runs. This polymer exhibited the following analysis:

Table I

| | |
|---|---|
| Trans, wt. %[a]: | 36.3 |
| Vinyl, wt. %[a]: | 40.7 |
| Styrene, wt. %[b]: | 31.2 |
| Block styrene, wt. %[c]: | 28.4 |
| $M_w/M_n \times 10^{-3d}$: | 268/127 |
| Inherent viscosity[e]: | 1.26 |

[a]Polymer microstructure was determined by infrared absorption spectroscopy. These values are normalized to reflect only the butadiene unsaturation.
[b]Total styrene determined by ultraviolet absorption spectroscopy.
[c]Block styrene content was determined essentially in accordance with the method of Kolthoff, I. M., Lee, T. S., Carr, C. W., 1 J. Poly Sci. 429 (1946).
[d]$M_w$, weight average molecular weight, and $M_n$, number average molecular weight, were determined by gel permeation chromatography in accordance with Kraus, G. and Stacy, C. J., J. Poly. Sci., Symposium No. 43, pp 329–343 (1973).
[e]Determined in accordance with U.S. 3,278,508, Col. 20, note a, with the modification that a sample of the solution was filtered through a fritted glass filter stick of grade C porosity and pressured directly into the viscometer.

In the following runs, the coupled polymer was employed in the form of a solution in 800 parts by weight cyclohexane per 100 parts polymer and in the absence of an antioxidant. n-Butyllithium (1.74 M in cyclohexane) and triethylaluminum (0.5 M in cyclohexane), respectively, were added to separate portions of the polymer solution in the amounts shown in Table II below and vigorously stirred for 70° C for 5 minutes.

The preformed hydrogenation catalyst, formed by the combination of nickel octoate (5 grams millimoles per hundred grams of polymer) with triethylaluminum (10 grams millimoles per hundred grams of polymer), then was added and the resulting mixture was warmed to 70° C. Hydrogen then was continuously admitted to the reaction zone at 50 psig with stirring of the mixture under essentially adiabatic conditions until 30 minutes after hydrogen consumption had essentially stopped.

The hydrogenated polymer solution was discharged into beverage bottles to which sufficient water and air were added to inactivate all organometal species present, and the bottles were tumbled at 70° C until the polymer solution (cement) turned light gray. It then was washed with dilute hydrochloric acid and subsequently washed free of acid with water. The hydrogenated polymer was isolated by evaporation of the solvent with final traces removed at reduced pressure. The results are shown below in Table II.

Table II

| Run | Compound, mhp[a] | Ni, mhp | H$_2$ Δ psi | Peak Hydrogenation Temperature Reached and time, ° C, min | Trans wt. %[b] | Uncoupled Polymer wt. %[c] |
|---|---|---|---|---|---|---|
| 1 | n-BuLi | 2.36 | 5 | 61 | 95/8.5 | 1.3 | 20.0 |
| 2 | n-BuLi | 5.0 | 5 | 59 | 95/9.0 | 1.0 | 20.5 |
| 3 | Et$_3$Al | 5.0 | 5 | 57 | 93/15 | 0.9 | 37.3 |
| 4 | none[d] | — | 7.5[e] | 53 | 90/33 | 4.3 | 17.6 |

[a]Gram millimoles per hundred grams of polymer
[b]Trans unsaturation determined by infrared absorption spectroscopy. Total residual unsaturation will be about twice this value, since trans and cis levels are believed to be about equal.
[c]Determined by gel permeation chromatography (GPC). Because the height of the peak corresponding to uncoupled polymer increases upon hydrogenation, this increase is taken as representing breakdown to uncoupled (or "parent") polymer. The values in this column are the respective ratios of the GPC peak height of the parent polymer to the sum of the peak heights of the parent polymer and the unhydrogenated coupled polymer multiplied by 100.
[d]Run 4 is a control run.
[e]The control polymer did not take up hydrogen until the nickel catalyst was increased, and even then the polymer was relatively incompletely hydrogenated.

In the above data, it can be seen that the inventive treatment in Runs 1, 2, and 3 wherein the silicon-coupled polymer was contacted with a hydrocarbon metal compound treating agent provided a marked improvement (increase) in the extent of hydrogenation and this occurred at a substantial reduction in the nickel catalyst requirement.

As can be observed above, employment of butyllithium in Runs 1 and 2 of the invention demonstrated substantially increased hydrogenation, i.e., substantially reduced residual unsaturation, as opposed to Control Run 4 which employed no organometal treatment. Furthermore, the uncoupled polymer in each of inventive Runs 1 and 2 was not much greater than that exhibited by the hydrogenated but untreated polymer of Run 4 in which the hydrogenation was imposed for some 33 minutes before peak temperature was reached. In Runs 1 and 2 of the invention far greater effective hydrogenation was obtained, using much less in the way of nickel catalysts, for a much shorter time. Peak hydrogenation temperature was only slightly above that of Run 4, yet the uncoupled polymer was not substantially greater, and the degree of hydrogenation was dramatically improved.

In Run 3 employing an organoaluminum treating agent, peak hydrogenation temperature was not greatly different than Control Run 4, but the required hydrogenation time was less than half that required by the Control Run 4, and did result in a very good reduction in residual unsaturation. The run resulted in an increase in uncoupled polymer, indicating some breakdown of the coupled polymer molecules. This may be desirable for some polymers, since such breakdown tends to increase heterogeneity index. The aluminum alkyl added as a treating agent effectively increased the Al/Ni ratio in the hydrogenation catalyst. Adjustment of the Al/Ni ratio in the hydrogenation catalyst to compensate for the increased Al added as the treating agent should avoid the breakdown of polymer of Run 3 employing aluminum alkyls as treating agents.

Polymers

The polymers employable in the process of my invention are characterized generically as conjugated diene polymers, of either a rubbery or resinous character, presently preferably sufficient conjugated diene to be rubbery, usually about at least 50 weight percent, prepared by the anionic solution polymerization of one or more conjugated dienes alone, or with one or more copolymerizable vinylidine group-containing comonomers, either in admixture or by sequential monomer addition, employing an organoalkali metal or organoalkaline earth metal initiator under anionic solution polymerization conditions of hydrocarbon solvent, temperature, time, and pressure.

Suitable monomers include the acyclic conjugated dienes, ordinarily containing 4 to 12 carbon atoms per molecule. Exemplary monomers including the presently preferred 1,3-butadiene and isoprene (2-methyl-1,3-butadiene), as well as 2,3-dimethyl-1,3-butadiene, 1,3-pentadiene, 1,3-octadiene, 2-phenyl 1,3-butadiene, and 3-n-butyl-1,3-octadiene; monovinylarenes, such as about 8 to 18 carbon atoms per molecule, including styrene and various of the hydrocarbyl substituted styrenes such as 4-cyclohexylstyrene, 3-methylstyrene, 4-propylstyrene, and p-tolylstyrene; monopropenylbenzenes; vinylnaphthalenes, such as 1-vinylnaphthalene, 1-vinyl-5-hexylnaphthalene; as well as vinylpyridines; vinylquinolines; vinylisoquinolines; and the like, all as are well known to be polymerizable or copolymerizable to provide suitable polymers. Where copolymers are prepared, these can be either random or block in nature.

Any of the known organoalkali metal or organoalkaline earth metal initiators can be employed, such as represented by $R_c{}^2M$ where M is alkali metal or alkaline earth metal, c is 1 for alkali metals or 2 for alkaline earth metals, and $R^2$ is a hydrocarbyl radical of 1 to 20 carbon atoms. These include such as n-butyllithium, sec-butyllithium, tert-butyllithium, n-amylsodium, n-hexylpotassium, calcium anthracene, n-phenylsodium, and the like; corresponding magnesium compounds; as well as a variety of multilithium polymerization initiators, and the like. Initiator amounts employable vary widely, as are well known in the art, such as about 0.05 to 100, preferably 0.1 to 20 gram milliequivalents of metal in the initiator per 100 grams of monomers polymerized.

Polymerization conditions known in the art can be employed, typically polymerizing in hydrocarbon diluents as hereinabove discussed, employing temperatures in the range of about $-50°$ to 200° C, preferably about 15° to 150° C, more preferably about 40° to 80° C, at pressures generally sufficient to maintain the polymerization admixture including diluent substantially in the liquid phase, for a suitable reaction time for generally substantially complete polymerization, such as a few minutes to several hours. Such diluents are hydrocarbons, paraffinic, cycloparaffinic, and/or aromatic, presently conveniently of 4 to 10 carbon atoms per molecule. Examples include n-hexane, n-heptane, butane, 2,2,4- trimethyl-pentane, cyclohexane, benzene, toluene, and the like, alone or in admixture.

Coupling

At the end of polymerization, the polymer containing carbon-alkali metal or carbon-alkaline earth metal end-groups are treated with a silicon-based or germanium-based treating agent effective to couple the polymer moieties, to produce coupled linear or branched polymers of increased molecular weight. These silicon-based or germanium-based treating agents produce the silicon or germanium coupled polymers to which I apply the mode of my invention prior to hydrogenation of the polymers.

The amounts of the silicon or germanium coupling agent are those known to be employed in the art, and are within the skill of the art. Typical amounts of appropriate coupling agents with a functionality of two or more are in the range of about 0.5 to 2 equivalents of coupling agent per equivalent of polymer-metal, more preferably substantially stoichiometric amounts. The treatment is applied, of course, to the polymer as the polymer-alkali metal or polymer-alkaline earth metal moieties but prior to quenching, that is prior to treatment of the polymer in a manner to inactivate the terminal alkali metal or alkaline earth metal entities.

Thereafter, the polymer can be recovered, if desired, by means known in the art for separation of polymers from hydrocarbon diluents. If so, thereafter, prior to hydrogenation, the polymer then is redissolved in a suitable hydrocarbon diluent. Alternatively and preferably, the polymer solution itself, after the coupling reaction and without quenching, is employed directly for hydrogenation pretreatment according to my invention followed by hydrogenation.

SILICON AND GERMANIUM COUPLING AGENTS

The silicic or germanic compounds employed couple the conjugated diene polymer moieties formed by polymerization, and include the silicon polyhalides such as silicon tetrachloride, silicon tetrabromide, and silicon tetraiodide, corresponding tri- and di-halides, and also silanes and open chain and cylic siloxanes, resulting in a silicon or germanium nucleus in the coupled polymer. Silanes contain one silicon atom per molecule. Open chain siloxanes contain two to 12 silicon atoms per molecule. Cyclic siloxanes have three to six silicon atoms per molecule. The silicon tetrahalides and silanes can be represented by the formula $R_n{}^3SiX_{4-n}$, wherein $R^3$ is hydrogen or an alkyl, cycloalkyl, aryl, alkaryl, or aralkyl, radical containing 1 to 20 carbon atoms, X is halogen or $YR^3$ wherein Y is O, $NR^3$ or S, and n is an integer of 0 to 2. The silanes must contain at least two of the reactive groups of halogen, $-OR^3$, $-NR_2{}^3$ or $-SR^3$.

The open chain siloxanes can be represented by the formula

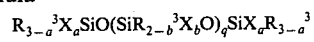

wherein $R^3$ and X are as above described, a is an integer of from 0 to 3, b is an integer of 0 to 2, the sum of the a's and 3 s is at least 2, and q is an integer of 0 to 10.

Cyclic siloxanes can be represented by the formula

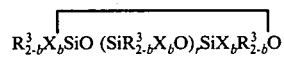

wherein $R^3$, X, and b are as above described, the sum of the b's is at least 2, and r is an integer of 1 to 4.

It can be seen from the above formulas that the siloxanes, both the open chain and the cyclic compounds, also contain at least 2 of the reactive substituents, halogen, $-OR^3$, $-NR_2{}^3$ or $-SR$. Examples of the silicic compounds include trifluorosilane, difluoro(dimethyl)silane, diodo(didoecyl)silane, dichloro(diphenyl)silane, phenyl(tri-n-butoxy)silane, tetradodecoxysilane (dodecylorthosilicate), phenyltri(phenylmercapto)silane, methyltri(methylamino) silane, diphenyldi(dieicosylamino)silane, hexamethoxydisiloxane, [1,1,5,5,9,9,- hexa(ethoxy)1,9-diethyl]pentasiloxane, 3,5-dichlorotetrasiloxane, octabromocyclotetrasiloxane, 1,1,5,5,9,9-hexachlorocyclohexasiloxane, and the like.

Corresponding germanium-based coupling agents are employable in the process of my invention, and the same generic types of compounds and species are useful, substituting germanium for silicon in the above descriptions, without needlessly prolonging this disclosure.

Polymers treated in accordance with the overall process of my invention can be blended with other polymers, compounded with oils, fillers, antioxidants, pigments, stabilizers, reinforcing agents, and a wide variety of other compounding ingredients for production of compounded materials suitable for fabricating hose, belting, pipe, film, and other articles, including a wide variety of molded goods. My polymers also are useful as viscosity index improvers and pour-point depressants in oil-based blends.

The disclosure, including data, illustrate the value and effectiveness of my invention. The examples, the knowledge and background of the field of the invention and general principles of chemistry and other applicable sciences have formed the bases from which the broad descriptions of the invention including the ranges of conditions and the generic conditions of operant components have been developed, which have formed the bases of my claims here appended.

I claim:

1. The process of hydrogenation of a silicon-coupled or germanium-coupled conjugated diene polymer which comprises:

treating said coupled conjugated diene polymer as said solution in hydrocarbon diluent with a minor effective amount of an organometal treating agent which is hydrocarbonlithium, -sodium, -potassium, -magnesium, -calcium, -zinc, or -aluminum compound, wherein said minor effective amount of said organometal treating agent is effective to reduce the residual olefinic unsaturation of said coupled polymer on subsequent hydrogenation of said coupled polymer, and thereafter hydrogenating said organometal-treated coupled polymer under hydrogenation conditions to substantially reduce at least the olefinic unsaturation, wherein said organometal treating agent is represented by $R_aH_bM$ wherein $b$ is 0 for all metals except aluminum, and is 0, 1, 2, or 3 where M is aluminum, and $a + b$ = valence of M.

2. The process according to claim 1 wherein said organometal treating agent is represented by $R_aH_bM$ wherein M is said lithium, sodium, potassium, calcium, magnesium, zinc, or aluminum; R represents a hydrocarbon radical of 1 to 12 carbon atoms, such that said organometal treating agent contains up to 20 carbon atoms per molecule; $a = 1$ and $b = 0$ when M is lithium, sodium, or potassium; $a = 2$ and $b = 0$ when M is zinc, magnesium or calcium; and $a$ is 1, 2 or 3, and $b$ is 0, 1, or 2, such that $a + b = 3$, when M is aluminum.

3. The process according to claim 2 wherein said organometal treating agent is n-butyllithium, sec-butyllithium, tert-butyllithium, n-amylsodium, n-hexylpotassium, di-n-amylmagnesium, dimethylmagnesium, diethylmagnesium, diisopropylcalcium, di-n-butylmagnesium, di(2-ethylhexyl)magnesium, diethylzinc, phenyllithium, diphenylmagnesium, benzyllithium, di-p-tolylmagnesium, p-tolyllithium, cyclohexyllithium, cyclohexyl-2-ethylpentylmagnesium, bis(3-phenylpropyl)magnesium, trimethylaluminum, triethylaluminum, di-n-butylaluminum hydride, 2-ethylhexylaluminum dihydride, triphenylaluminum, cyclohexylbis(2-ethylpentyl)aluminum, or mixtures thereof.

4. The process according to claim 1 wherein said minor effective amount of said organometal treating agent is in the range of about 0.1 to 25 gram millimoles per 100 grams of coupled polymer, and wherein said treating is conducted at a temperature in the range of about 10° C to 110° C.

5. The process according to claim 4 wherein said minor effective amount of said organometal treating agent is in the range of about 1 to 10 gram millimoles per 100 grams of coupled polymer, said treating temperature is in the range of about 20° C to 90° C, and wherein said hydrocarbon diluent is cyclohexane, methylcyclohexane, hexane, benzene, isooctane, or n-heptane.

6. The process according to claim 4 wherein said coupled polymer in said hydrocarbon diluent represents a concentration of said polymer of about 1 to 50 weight percent, and said organometal treating agent is employed as a solution in a hydrocarbon diluent of about 0.1 to 2 molar.

7. The process according to claim 6 wherein said hydrogenation is conducted at a temperature in the range of about 25° C to 175° C, under pressure of about 10 to 5000 psig for a time of about 30 minutes to 4 hours, employing a catalyst comprising (B) a cobalt or nickel carboxylate or alkoxide, and (A) an aluminum alkyl in amounts effective for hydrogenation.

8. The process according to claim 7 wherein said (B) nickel or cobalt carboxylate or alkoxide is the acetate, propionate, benzoate, octanoate, butoxide, ethoxide, or isopropoxide, and wherein said (A) aluminum alkyl compound is triisobutylaluminum, triethylaluminum, triisopropylaluminum, tripropylaluminum, or trioctyaluminum.

9. The process according to claim 7 wherein said conjugated diene polymer is a polymer of a conjugated diene of 4 to 12 carbon atoms per molecule, or a copolymer of at least one thereof with a copolymerizable vinylidine group-containing monomer of up to 18 carbon atoms per molecule selected from the group consisting of monovinyl arenes, substituted styrenes, monopropenylbenzenes, vinylnaphthalenes, vinylquinolines, vinylisoquinolines, and vinylpyridines.

10. The process according to claim 9 wherein said coupled polymer is a silicon coupled polymer and said organometal treating agent is hydrocarbyl lithium or hydrocarbyl aluminum compound.

11. The process according to claim 10 wherein said conjugated diene polymer is a copolymer of a said conjugated diene with a said monovinylarene.

12. The process according to claim 11 wherein said copolymer is a rubbery butadiene/styrene copolymer coupled with silicon tetrachloride, and wherein said organometal treating agent is n-butyllithium.

13. A process for preparing a hydrogenated polymer which comprises the steps of:

polymerizing, under anionic solution polymerization conditions in a hydrocarbon diluent at polymerization temperatures employing an organoalkali metal or organoalkaline earth metal initiator, at least one conjugated diene or at least one conjugated diene with a copolymerizable vinylidine group-containing comonomer selected from the group consisting of monovinylarenes, hydrocarbyl substituted styrenes, monopropenylbenzenes, vinylnaphthalenes, vinylquinolines, vinylisoquinolines, and vinylpyridines, thereby preparing a conjugated diene polymer, treating said conjugated diene polymer with a silicon- or germanium-based coupling agent in a minor effective amount and under conditions effective to couple said conjugated diene polymer, thereby preparing a coupled conjugated diene polymer, treating said coupled conjugated diene polymer with a minor effective amount of an organometal treating agent which is a hydrocarbyl lithium, hydrocarbyl sodium, hydrocarbyl potassium, hydrocarbyl magnesium, hydrocarbyl calcium, hydrocarbyl zinc, hydrocarbyl aluminum, or hydrocarbyl aluminum hydride compound, wherein said minor effective amount of said organometal treating agent is effective to reduce the residual olefinic unsaturation of said coupled polymer on subsequent hydrogenation of said coupled polymer, and hydrogenating said organometal treated coupled conjugated diene polymer under hydrogenation conditions of a catalyst, time, temperature, and pressure, effective to substantially saturate at least the olefinically derived double bonds of said treated polymer, thereby producing a hydrogenated polymer.

14. The process according to claim 13 wherein said organometal treating agent is represented by $R_aH_bM_c$ wherein M is said lithium, sodium, potassium, magnesium, calcium, zinc, or aluminum; $a$ is 1 and $b$ is 0 where M is lithium, sodium, or potassium; $a$ is 2 and $b$ is 0 where M is zinc, magnesium or calcium; and $a$ is 1, 2, or 3 and $b$ is 0, 1, or 2, such that $a + b = 3$, where M is aluminum; and each R is a hydrocarbyl radical of 1 to 12 carbon atoms.

15. The process according to claim 14 wherein said organometal treating agent is n-butyllithium, sec-butyllithium, tert-butyllithium, n-amylsodium, n-hexylpotassium, di-n-amylmagnesium, dimethylmagnesium, diethylmagnesium, di-isopropylcalcium, di-n-butylmagnesium, di(2-ethylhexyl)magnesium, diethylzinc, phenyllithium, diphenylmagnesium, benzyllithium, di-p-tolylmagnesium, p-tolyllithium, cyclohexyllithium, cyclohexyl-2-ethylpentylmagnesium, bis(3-phenylpropyl)magnesium, trimethylaluminum, triethylaluminum, di-n-butylaluminum hydride, 2-ethylhexylaluminum dihydride, triphenylaluminum, cyclohexylbis(2-ethylpentyl)aluminum, or mixtures thereof.

16. The process according to claim 15 wherein said minor effective amount of said organometal treating agent is in the range of about 0.1 to 25 gram millimoles per 100 grams of coupled polymer, and wherein said treating is conducted at a temperature in the range of about 10° C to 110° C.

17. The process according to claim 16 wherein said minor effective amount of said organometal treating agent is in the range of about 1 to 10 gram millimoles per 100 grams of coupled polymer, said treating temperature is in the range of about 20° C to 90° C, and wherein said hydrocarbon diluent is cyclohexane, methylcyclohexane, hexane, benzene, isooctane, or n-heptane.

18. The process according to claim 16 wherein said coupled polymer in said hydrocarbon diluent represents a concentration of said polymer of about 1 to 50 weight percent, and said organometal treating agent is employed as a solution in a hydrocarbon diluent of about 0.1 to 2 molar.

19. The process according to claim 18 wherein said hydrogenation is conducted at a temperature in the range of about 25° C to 175° C, under pressure of about 10 to 5000 psig, for a time of about 30 minutes to 4 hours, employing a catalyst comprising (B) a cobalt or nickel carboxylate or alkoxide, and (A) an aluminum alkyl in amounts effective for hydrogenation.

20. The process according to claim 11 wherein said conjugated diene polymer is a copolymer of a conjugated diene and a said monovinylarene.

21. The process according to claim 20 wherein said conjugated diene is selected from the group consisting of 1,3-butadiene, 2-methyl-1,3-butadiene, 2,3-dimethyl-1,2-butadiene, 1,3-pentadiene, 1,3-octadiene, 2-phenyl-1,3-butadiene, and 3-n-butyl-1,3-octadiene.

22. The process according to claim 21 wherein said initiator is selected from the group consisting of n-butyllithium, sec-butyllithium, tertbutyllithium, n-amylsodium, n-hexylpotassium, calcium anthracene, and n-phenylsodium, employing said initiator in amounts sufficient to provide about 0.05 to 100 gram milliequivalents of metal in the initiator per 100 grams monomer polymerized, and employing polymerization temperatures in the range of about 50° to 200° C under a pressure sufficient to maintain monomer and diluent substantially in the liquid phase.

23. The process according to claim 22 employing said silicon or germanium treating agent in an amount sufficient to provide about 0.5 to 2.0 equivalents of treating agent per equivalent of polymer-alkali metal or polymeralkaline earth metal.

24. The process according to claim 23 wherein said treating agent is a silicon treating agent, and is a silicon polyhalide, silane, or siloxane.

25. The process according to claim 23 wherein said treating agent is a germanium polyhalide or germane.

26. The process according to claim 24 wherein said treating agent is a silicon polyhalide and is silicon tetrachloride, the coupled polymer is a rubbery block copolymer of styrene and butadiene, and said organometal treating agent is n-butyllithium or triethylaluminum.

* * * * *